United States Patent [19]

Barnes

[11] 4,223,391
[45] Sep. 16, 1980

[54] PARALLEL ACCESS ALIGNMENT NETWORK WITH BARREL SWITCH IMPLEMENTATION FOR D-ORDERED VECTOR ELEMENTS

[75] Inventor: George H. Barnes, Wayne, Pa.

[73] Assignee: Burroughs Corporation, Detroit, Mich.

[21] Appl. No.: 847,212

[22] Filed: Oct. 31, 1977

Related U.S. Application Data

[63] Continuation-in-part of Ser. No. 820,234, Jul. 29, 1977, Pat. No. 4,162,534.

[51] Int. Cl.$^3$ .............................................. G06F 7/00
[52] U.S. Cl. ................................................... 364/900
[58] Field of Search ... 364/900 MS File, 200 MS File

[56] References Cited

U.S. PATENT DOCUMENTS

| | | | |
|---|---|---|---|
| 3,274,556 | 9/1966 | Paul et al. | 364/900 |
| 3,510,846 | 5/1970 | Goldschmidt et al. | 364/900 |
| 3,535,694 | 10/1970 | Anacker et al. | 364/200 |
| 3,582,899 | 6/1971 | Semmelhaack | 364/200 |
| 3,596,251 | 7/1971 | Buchan et al. | 364/900 |
| 3,610,903 | 10/1971 | Stokes et al. | 364/900 X |
| 3,659,274 | 4/1972 | Kyser | 364/900 |
| 3,747,070 | 7/1973 | Huttenhoff | 364/900 |
| 3,790,960 | 2/1974 | Amdahl et al. | 364/900 |
| 3,812,467 | 5/1974 | Batcher | 364/900 |
| 3,934,132 | 1/1976 | Desmonds | 364/900 X |
| 4,051,551 | 9/1977 | Lawrie et al. | 364/200 |

Primary Examiner—Melvin B. Chapnick
Attorney, Agent, or Firm—Leonard C. Brenner; Edmund M. Chung; Kevin R. Peterson

[57] ABSTRACT

An alignment network between N parallel data input ports and N parallel data outputs includes a first and a second barrel switch. The first barrel switch fed by the N parallel input ports shifts the N outputs thereof and in turn feeds the N-1 input data paths of the second barrel switch according to the relationship $X = k^y$ modulo N wherein x represents the output data path ordering of the first barrel switch, y represents the input data path ordering of the second barrel switch, and k equals a primitive root of the number N. The zero (0) ordered output data path of the first barrel switch is fed directly to the zero ordered output port. The N-1 output data paths of the second barrel switch are connected to the N output ports in the reverse ordering of the connections between the output data paths of the first barrel switch and the input data paths of the second barrel switch. The second switch is controlled by a value m, which in the preferred embodiment is produced at the output of a ROM addressed by the value d wherein d represents the incremental spacing or distance between data elements to be accessed from the N input ports, and m is generated therefrom according to the relationship $d = k^m$ modulo N.

3 Claims, 11 Drawing Figures

_Fig.1_

_Fig.3_   _Fig.5_

| d | m | d | m | d | m |
|---|---|---|---|---|---|
| 401 | 227 | 451 | 121 | 501 | 428 |
| 402 | 458 | 452 | 478 | 502 | 431 |
| 403 | 426 | 453 | 43 | 503 | 60 |
| 404 | 36 | 454 | 399 | 504 | 447 |
| 405 | 56 | 455 | 357 | 505 | 492 |
| 406 | 9 | 456 | 86 | 506 | 313 |
| 407 | 230 | 457 | 88 | 507 | 69 |
| 408 | 102 | 458 | 273 | 508 | 34 |
| 409 | 503 | 459 | 190 | 509 | 377 |
| 410 | 193 | 460 | 385 | 510 | 38 |
| 411 | 408 | 461 | 429 | 511 | 110 |
| 412 | 123 | 462 | 108 | 512 | 262 |
| 413 | 379 | 463 | 258 | 513 | 174 |
| 414 | 17 | 464 | 432 | 514 | 271 |
| 415 | 210 | 465 | 185 | 515 | 59 |
| 416 | 324 | 466 | 90 | 516 | 312 |
| 417 | 468 | 467 | 61 | 517 | 376 |
| 418 | 267 | 468 | 412 | 518 | 261 |
| 419 | 246 | 469 | 150 | 519 | 58 |
| 420 | 180 | 470 | 448 | 520 | 260 |
| 421 | 480 | 471 | 162 | | |
| 422 | 40 | 472 | 282 | | |
| 423 | 80 | 473 | 493 | | |
| 424 | 66 | 474 | 338 | | |
| 425 | 291 | 475 | 275 | | |
| 426 | 483 | 476 | 314 | | |
| 427 | 136 | 477 | 154 | | |
| 428 | 393 | 478 | 455 | | |
| 429 | 73 | 479 | 70 | | |
| 430 | 45 | 480 | 83 | | |
| 431 | 112 | 481 | 226 | | |
| 432 | 235 | 482 | 35 | | |
| 433 | 472 | 483 | 229 | | |
| 434 | 461 | 484 | 192 | | |
| 435 | 253 | 485 | 378 | | |
| 436 | 499 | 486 | 323 | | |
| 437 | 388 | 487 | 245 | | |
| 438 | 418 | 488 | 39 | | |
| 439 | 401 | 489 | 290 | | |
| 440 | 264 | 490 | 392 | | |
| 441 | 24 | 491 | 111 | | |
| 442 | 279 | 492 | 460 | | |
| 443 | 353 | 493 | 387 | | |
| 444 | 49 | 494 | 263 | | |
| 445 | 27 | 495 | 352 | | |
| 446 | 365 | 496 | 364 | | |
| 447 | 510 | 497 | 175 | | |
| 448 | 359 | 498 | 477 | | |
| 449 | 176 | 499 | 356 | | |
| 450 | 424 | 500 | 272 | | |

| |
|---|
| FIG.6A |
| FIG.6B |
| FIG.6C |

| d | m | d | m | d | m | d | m |
|---|---|---|---|---|---|---|---|
| 1 | 0 | 51 | 188 | 101 | 440 | 151 | 42 |
| 2 | 318 | 52 | 410 | 102 | 506 | 152 | 85 |
| 3 | 1 | 53 | 152 | 103 | 7 | 153 | 189 |
| 4 | 116 | 54 | 321 | 104 | 208 | 154 | 107 |
| 5 | 52 | 55 | 350 | 105 | 64 | 155 | 184 |
| 6 | 319 | 56 | 445 | 106 | 470 | 156 | 411 |
| 7 | 11 | 57 | 172 | 107 | 277 | 157 | 161 |
| 8 | 434 | 58 | 518 | 108 | 119 | 158 | 337 |
| 9 | 2 | 59 | 368 | 109 | 383 | 159 | 153 |
| 10 | 370 | 60 | 169 | 110 | 148 | 160 | 82 |
| 11 | 298 | 61 | 125 | 111 | 453 | 161 | 228 |
| 12 | 117 | 62 | 450 | 112 | 243 | 162 | 322 |
| 13 | 294 | 63 | 13 | 113 | 362 | 163 | 289 |
| 14 | 329 | 64 | 348 | 114 | 490 | 164 | 459 |
| 15 | 53 | 65 | 346 | 115 | 269 | 165 | 351 |
| 16 | 232 | 66 | 97 | 116 | 316 | 166 | 476 |
| 17 | 187 | 67 | 139 | 117 | 296 | 167 | 427 |
| 18 | 320 | 68 | 303 | 118 | 166 | 168 | 446 |
| 19 | 171 | 69 | 218 | 119 | 198 | 169 | 68 |
| 20 | 168 | 70 | 381 | 120 | 487 | 170 | 37 |
| 21 | 12 | 71 | 164 | 121 | 76 | 171 | 173 |
| 22 | 96 | 72 | 436 | 122 | 443 | 172 | 311 |
| 23 | 217 | 73 | 99 | 123 | 344 | 173 | 57 |
| 24 | 435 | 74 | 250 | 124 | 248 | 174 | 519 |
| 25 | 104 | 75 | 105 | 125 | 156 | 175 | 115 |
| 26 | 92 | 76 | 287 | 126 | 331 | 176 | 10 |
| 27 | 3 | 77 | 309 | 127 | 438 | 177 | 369 |
| 28 | 127 | 78 | 93 | 128 | 146 | 178 | 293 |
| 29 | 200 | 79 | 19 | 129 | 196 | 179 | 231 |
| 30 | 371 | 80 | 284 | 130 | 144 | 180 | 170 |
| 31 | 132 | 81 | 4 | 131 | 405 | 181 | 95 |
| 32 | 30 | 82 | 141 | 132 | 415 | 182 | 103 |
| 33 | 299 | 83 | 158 | 133 | 182 | 183 | 126 |
| 34 | 505 | 84 | 128 | 134 | 457 | 184 | 131 |
| 35 | 63 | 85 | 239 | 135 | 55 | 185 | 504 |
| 36 | 118 | 86 | 513 | 136 | 101 | 186 | 451 |
| 37 | 452 | 87 | 201 | 137 | 407 | 187 | 485 |
| 38 | 489 | 88 | 212 | 138 | 16 | 188 | 194 |
| 39 | 295 | 89 | 495 | 139 | 467 | 189 | 14 |
| 40 | 486 | 90 | 372 | 140 | 179 | 190 | 21 |
| 41 | 343 | 91 | 305 | 141 | 79 | 191 | 409 |
| 42 | 330 | 92 | 333 | 142 | 482 | 192 | 349 |
| 43 | 195 | 93 | 133 | 143 | 72 | 193 | 517 |
| 44 | 414 | 94 | 396 | 144 | 234 | 194 | 124 |
| 45 | 54 | 95 | 223 | 145 | 252 | 195 | 347 |
| 46 | 15 | 96 | 31 | 146 | 417 | 196 | 138 |
| 47 | 78 | 97 | 326 | 147 | 23 | 197 | 380 |
| 48 | 233 | 98 | 340 | 148 | 48 | 198 | 98 |
| 49 | 22 | 99 | 300 | 149 | 509 | 199 | 286 |
| 50 | 422 | 100 | 220 | 150 | 423 | 200 | 18 |

*Fig.6A*

| d | m | d | m | d | m | d | m |
|---|---|---|---|---|---|---|---|
| 201 | 140 | 251 | 113 | 301 | 206 | 351 | 297 |
| 202 | 238 | 252 | 129 | 302 | 360 | 352 | 328 |
| 203 | 211 | 253 | 515 | 303 | 441 | 353 | 186 |
| 204 | 304 | 254 | 236 | 304 | 403 | 354 | 167 |
| 205 | 395 | 255 | 240 | 305 | 177 | 355 | 216 |
| 206 | 325 | 256 | 464 | 306 | 507 | 356 | 91 |
| 207 | 219 | 257 | 473 | 307 | 335 | 357 | 199 |
| 208 | 6 | 258 | 514 | 308 | 425 | 358 | 29 |
| 209 | 469 | 259 | 463 | 309 | 8 | 359 | 62 |
| 210 | 382 | 260 | 462 | 310 | 502 | 360 | 488 |
| 211 | 242 | 261 | 202 | 311 | 122 | 361 | 342 |
| 212 | 268 | 262 | 203 | 312 | 209 | 362 | 413 |
| 213 | 165 | 263 | 254 | 313 | 266 | 363 | 77 |
| 214 | 75 | 264 | 213 | 314 | 479 | 364 | 421 |
| 215 | 247 | 265 | 204 | 315 | 65 | 365 | 151 |
| 216 | 437 | 266 | 500 | 316 | 135 | 366 | 444 |
| 217 | 143 | 267 | 496 | 317 | 44 | 367 | 367 |
| 218 | 181 | 268 | 255 | 318 | 471 | 368 | 449 |
| 219 | 100 | 269 | 389 | 319 | 498 | 369 | 345 |
| 220 | 466 | 270 | 373 | 320 | 400 | 370 | 302 |
| 221 | 481 | 271 | 214 | 321 | 278 | 371 | 163 |
| 222 | 251 | 272 | 419 | 322 | 26 | 372 | 249 |
| 223 | 47 | 273 | 306 | 323 | 358 | 373 | 308 |
| 224 | 41 | 274 | 205 | 324 | 120 | 374 | 283 |
| 225 | 106 | 275 | 402 | 325 | 398 | 375 | 157 |
| 226 | 160 | 276 | 334 | 326 | 87 | 376 | 512 |
| 227 | 81 | 277 | 501 | 327 | 384 | 377 | 494 |
| 228 | 288 | 278 | 265 | 328 | 257 | 378 | 332 |
| 229 | 475 | 279 | 134 | 329 | 89 | 379 | 222 |
| 230 | 67 | 280 | 497 | 330 | 149 | 380 | 339 |
| 231 | 310 | 281 | 25 | 331 | 281 | 381 | 439 |
| 232 | 114 | 282 | 397 | 332 | 274 | 382 | 207 |
| 233 | 292 | 283 | 256 | 333 | 454 | 383 | 276 |
| 234 | 94 | 284 | 280 | 334 | 225 | 384 | 147 |
| 235 | 130 | 285 | 224 | 335 | 191 | 385 | 361 |
| 236 | 484 | 286 | 390 | 336 | 244 | 386 | 315 |
| 237 | 20 | 287 | 354 | 337 | 391 | 387 | 197 |
| 238 | 516 | 288 | 32 | 338 | 386 | 388 | 442 |
| 239 | 137 | 289 | 374 | 339 | 363 | 389 | 155 |
| 240 | 285 | 290 | 50 | 340 | 355 | 390 | 145 |
| 241 | 237 | 291 | 327 | 341 | 430 | 391 | 404 |
| 242 | 394 | 292 | 215 | 342 | 491 | 392 | 456 |
| 243 | 5 | 293 | 28 | 343 | 33 | 393 | 406 |
| 244 | 241 | 294 | 341 | 344 | 109 | 394 | 178 |
| 245 | 74 | 295 | 420 | 345 | 270 | 395 | 71 |
| 246 | 142 | 296 | 366 | 346 | 375 | 396 | 416 |
| 247 | 465 | 297 | 301 | 347 | 259 | 397 | 508 |
| 248 | 46 | 298 | 307 | 348 | 317 | 398 | 84 |
| 249 | 159 | 299 | 511 | 349 | 51 | 399 | 183 |
| 250 | 474 | 300 | 221 | 350 | 433 | 400 | 336 |

PARALLEL ACCESS ALIGNMENT NETWORK WITH BARREL SWITCH IMPLEMENTATION FOR D-ORDERED VECTOR ELEMENTS

The invention described herein was made in the performance of work under NASA Contract Number NAS 2-9456 and is subject to the provisions of Section 305 of the National Aeronautics and Space Act of 1958 (72 Stat. 435, 42 U.S.C. 2457).

CROSS REFERENCE TO RELATED APPLICATIONS

This is a continuation-in-part of application Ser. No. 820,234 filed July 29, 1977, now U.S. Pat. No. 4,162,534.

In copending application, Ser. No. 682,526, now U.S. Pat. No. 4,051,551, for a "Multidimensional Parallel Access Computer Memory System", filed in the name of D. H. Lawrie et al, and assigned to the assignee of present invention, there is described and claimed a parallel data processing system for storing and fetching d-ordered vectors. Although not limited thereto, the present alignment network invention may be used with or in such a system.

BACKGROUND OF THE INVENTION

The present invention relates to an alignment network for use in a parallel data processing environment. More particularly, the present invention finds application in unscrambing a d-ordered vector having its elements stored a distance d apart from each other in the parallel memory modules of a parallel data processor.

In the prior art, as disclosed in U.S. patent application, Ser. No. 682,526, now U.S. Pat. No. 4,051,551, filed May 3, 1976, in the names of D. H. Lawrie and C. R. Vora and assigned to the assignee of the present invention, there is described a cross-bar network for transferring and aligning data between a set of parallel memory modules and a set of parallel processors. The cross-bar network so disclosed is relatively easy to program or control; however, it is also relatively costly in components requiring $N^2$ elementary elements to transmit data through wherein N is the number of parallel memory modules storing data to be aligned.

Other prior art networks require fewer components but present difficult control problems. Typical of this type of alignment network is the Benes network requiring only $2N \log_2 N$ elements, see Benes, V. E., "Optimal Rearrangeable Multi-stage Connecting Networks, Part 2," Bell System Technical Journal Vol. 43, 1964, p. 1641.

Still other prior art alignment networks require fewer components than the cross-bar network and are not too difficult to control or program, but these require multiple data flow transitions cycling through a single alignment layer thereby increasing the time required for data to pass through the network; see Roger C. Swanson, "Interconnections for Parallel Memories to Unscramble p-ordered Vectors", IEEE trans. Computers, November 1974. Swanson's "p-ordered vectors" corresponds to the "d-ordered vector" terminology used herein.

Therefore, it is an object of the present invention to provide an alignment network for d-ordered vectors requiring fewer components than a cross-bar network and yet being easy to control.

It is yet another object of the invention to provide alignment for d-ordered vectors while requiring only a single pass through any of the elements used for alignment.

SUMMARY OF THE INVENTION

The above and other objects of the invention are realized through an alignment network for use with a parallel data system having N parallel data input ports and N parallel data output ports, the alignment network therebetween having a first and a second barrel switch. The first barrel switch fed by the N parallel input ports shifts the N outputs thereof and in turn feeds the $N-1$ input data paths of the second barrel switch according to the relationship $x = k^y$ modulo N wherein x represents the output data path ordering of the first barrel switch, y represents the input ordering of the second barrel switch and k equals a primitive root of the number N. The zero (0) ordered output data path of the first barrel switch is fed directly to the zero (0) ordered output port. The output data paths of the second barrel switch are connected to the N output ports in reverse ordering to the connections between the output data paths of the first barrel switch and input data paths of the second barrel switch. The second switch is controlled by a value m, which in the preferred embodiment is produced at the output of a ROM addressed by the value d wherein d represents the incremental spacing or distance between data elements to be accessed from the N input ports, and m is generated therefrom according to the relationship $d = k^m$ modulo N.

BRIEF DESCRIPTION OF THE DRAWINGS

The above objects and advantages and features of the present invention will become more readily apparent from a review of the following specification in relation with the drawings wherein:

FIG. 6 comprising FIGS. 6A, 6B and 6C, is a presentation in tabular format of the generation of control words for an alignment network operating with 521 parallel memory modules;

DETAILED DESCRIPTION OF THE PREFERRED EMBODIMENT

Figure 1:
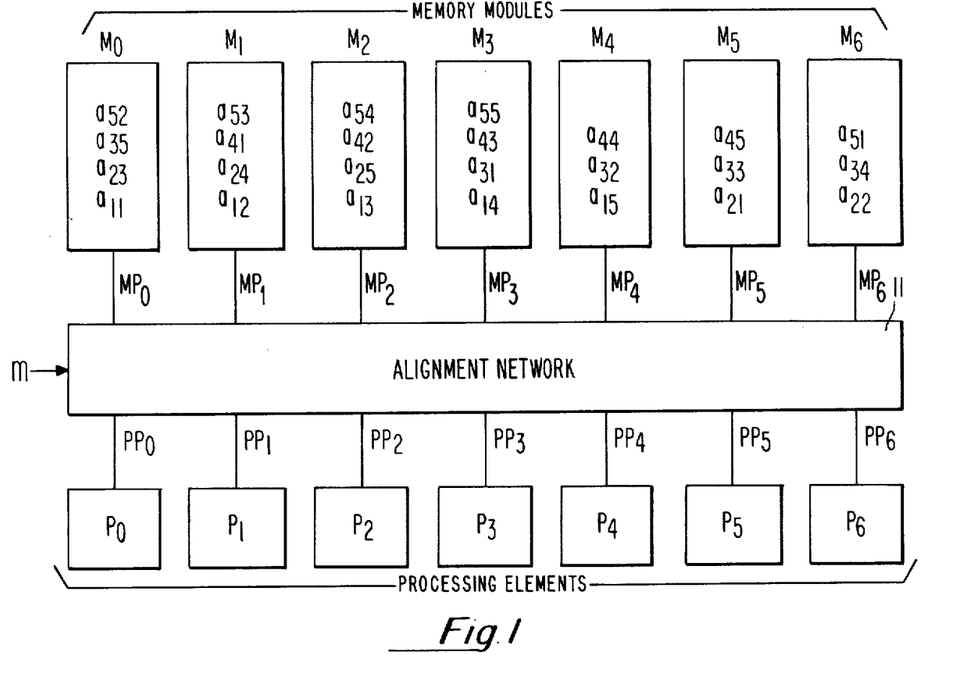
FIG. 1 is a block diagram illustrating a typical operating environment of the present alignment network invention.

With reference to FIG. 1, the alignment network of the present invention interfaces between a plurality of memory modules M0–M6 and a plurality of processing elements P0–P6. Data stored in the memory modules M0–M6 may be accessed in parallel through Memory Ports MP0–MP6, aligned in the Alignment Network 11 as directed by control word m, and fed through Processing Ports PP0–PP6 for parallel processing by the Processing Elements P0–P6. Although seven Memory Modules M0–M6 and seven Processing Elements P0–P6 are shown in FIG. 1, in alternate embodiments, other system arrangements having differing numbers of Memory Modules and Processing Elements may be used, see U.S. patent application Ser. No. 682,526 filed May 3, 1976, now U.S. Pat. No. 4,051,551 issued Sept. 27, 1977 by D. H. Lawrie et al for a "Multidimensional Parallel Access Computer Memory System", assigned to the assignee of the present invention.

For purposes of illustration, a $5 \times 5$ two-dimensional matrix comprising Data Elements $a_{11}$ through $a_{55}$ is shown loaded into Memory Modules M0–M6. To process in parallel Data Elements $a_{11}$, $a_{12}$, $a_{13}$, $a_{14}$, and $a_{15}$ the Alignment Network need merely establish a direct data flow path between Memory Ports MP0, MP1, MP2, MP3 and MP4 and Processing Ports PP0, PP1, PP2, PP3 and PP4, respectively. However, to process in parallel data elements $a_{11}$, $a_{21}$, $a_{31}$, $a_{41}$ and $a_{51}$ the alignment network must perform in essence a shifting operation to direct the data elements $a_{11}$, $a_{21}$, $a_{31}$, $a_{41}$ and $a_{51}$ to processors P0, P1, P2, P3 and P4, respectively. As can be seen, each data element in the set $a_{11}$, $a_{21}$, $a_{31}$, $a_{41}$ and $a_{51}$ is shifted five Memory Modules (modulo 7) from the preceding data element. The shift occurs modulo 7 since there are seven memory modules (M0–M6). In general, the required shift would occur modulo N where N equals the number of memory modules.

Figure 2:
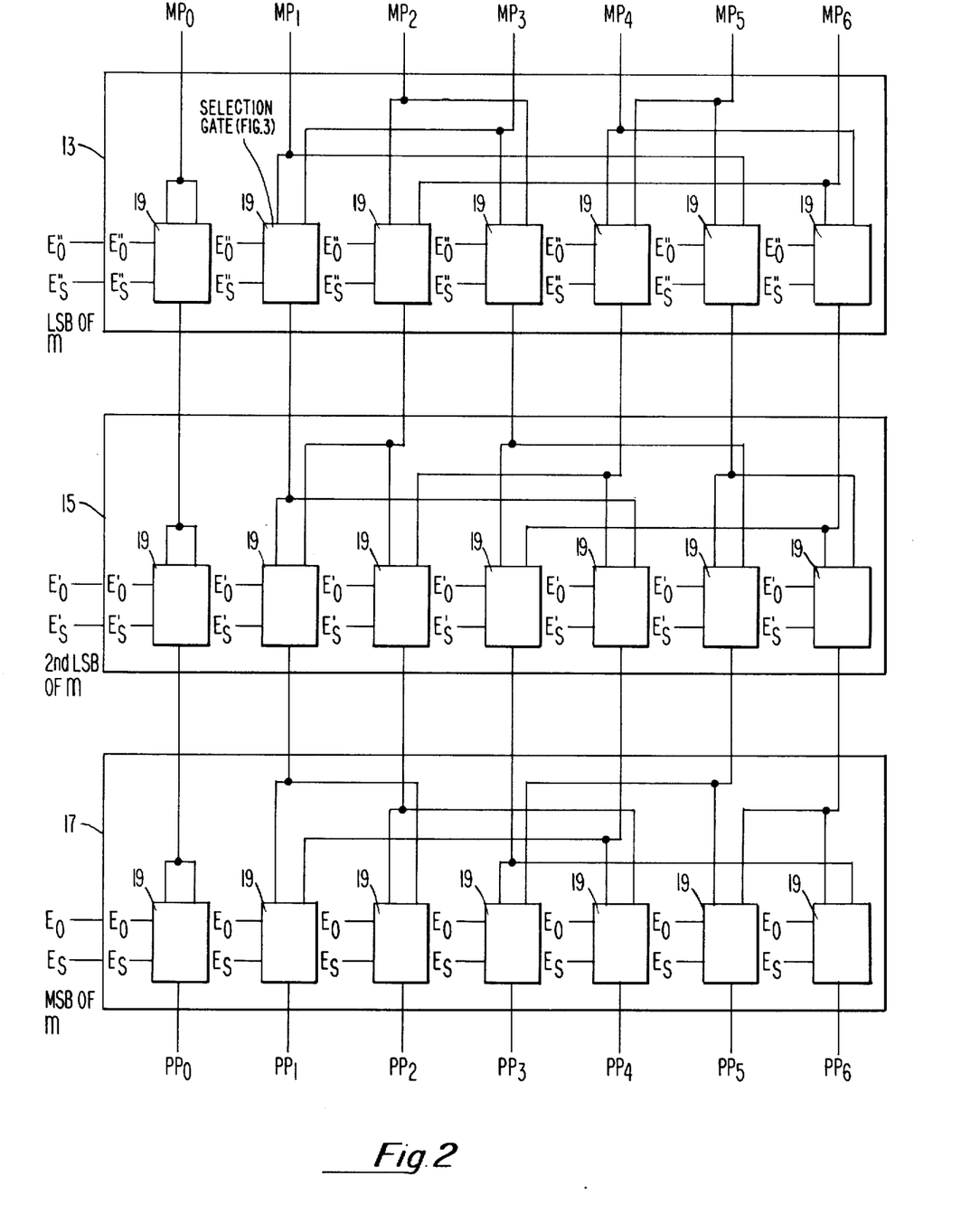
FIG. 2 is a block diagram of an arrangement of the alignment network of the present invention suitable for use in the environment of FIG. 1.

For illustrative purposes, a specific example of how the alignment network 11 of the present invention functions will be examined followed by a more general approach to extend the application of the present invention to more universal situations. With reference to FIG. 2, the alignment network 11 having seven (7) Memory ports MP0–MP6 and seven (7) Processing Ports PP0–PP6 is partitioned into a first level 13, a second level 15 and a third level 17.

Figure 3:
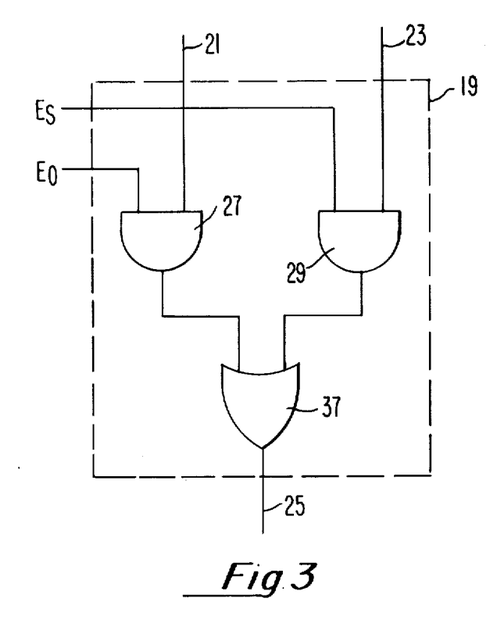
FIG. 3 is a logic diagram of a two-input selection gate used in the alignment network of FIG. 2.

Each level 13, 15 and 17 includes seven (7) two-input selection gates 19, each having a first input 21, a second input 23, an output 25 and two selection control inputs EO and ES, see FIG. 3. For purposes of discussion, the control inputs of the selection gates 19 in the first level 13 are designated EO" and ES" while the control inputs of the selection gates 19 in the second level 15 are designated EO' and ES'. When a logical one or true level is present on the EO (or EO', EO") control input, a data communications path is provided between the first input 21 and the output 25. With a logical one or true level present on the ES (or ES', ES") control input, a data communications path is provided between the second input 23 and the output 25. All control inputs EO and ES are fashioned to receive complementary binary levels, so that a true or logical one level at EO implies a false or logical zero level at ES and vice-versa. The preferred embodiment fabrication of the simple two-input selection gate 19 will be detailed hereinafter.

All selection gates 19 in a given level 13, 15 or 17 may have their control inputs EO and ES connected in parallel. Thus, three bits of a control word m determines the data flow or shifting between the memory ports MP0–MP6 and the processing ports PP0–PP6. The most significant bit of m controls level 17, the second most significant bit controls level 15, and the least significant bit controls level 13. In essence the control word m provides control to the ES input of the selection gates 19 while a binary complement of m feeds the EO input of the gates 19.

With continued reference to FIG. 2, it can be seen that a control word m of 000 would introduce no shifting and thus direct data flow would occur between memory ports MP0–MP6 and processing ports PP0–PP6 respectively. For a control word m of 100, a shift of 4 (modulo 7) would occur in level 17 with no shift in levels 13 and 15. Likewise, a control word m of 010 would introduce a shift of 2 (modulo 7) in level 15 and a control word m of 001 would introduce a shift 3 (modulo 7) in level 13. Shifts may occur, of course, in more than one level. For example, a control word m of 111 would generate a shift in all three levels 13, 15 and 17. However, in practice, for the alignment network 11 as shown in FIG. 2, control words 110 and 111 are not required since the same shift amount occurs using 000 and 001 respectively.

The selection gate 19 is readily fashioned from a first AND gate 27, a second AND gate 29 and an OR gate 37, see FIG. 3. The AND gate 27 is fed by EO and by direct input 21. The AND gate 29 is fed by ES and shift input 23. The OR gate 37 is fed by both AND gates 27 and 29 and provides output 25. In some logic families the OR gate 37 may be fabricated as a "wired-OR" rather than as an actual physical gate.

Figure 4:
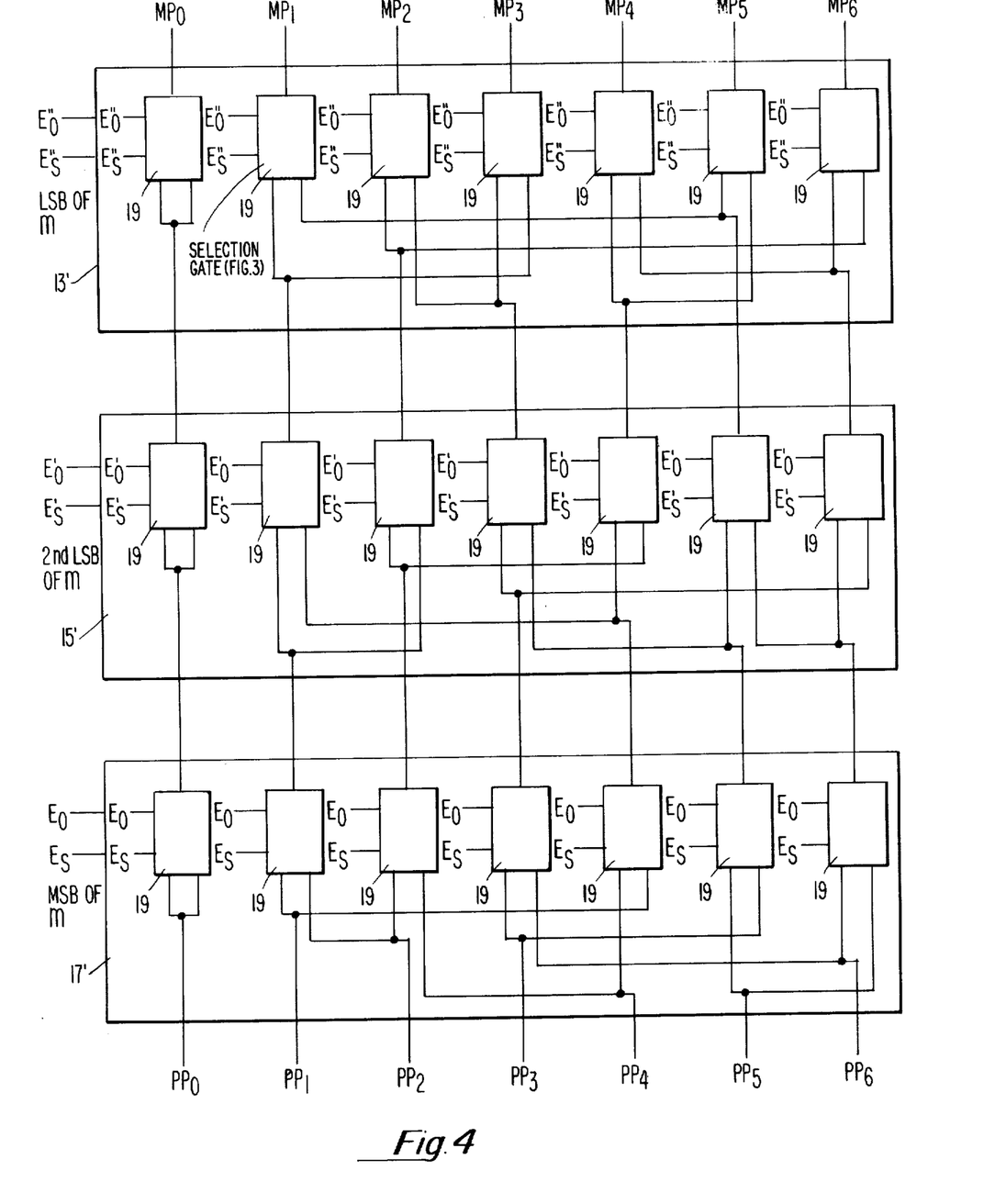
FIG. 4 is a return flow alignment network to complement the alignment network of FIG. 2.

The selection gate 19 fabrication as above described is unidirectional in that it provides data flow only from the memory ports MP0–MP6 to the processing ports PP0–PP6. Therefore, a reverse path must be provided to permit data to flow from the processing ports PP0–PP6 to the memory ports. Such reverse flow is easily provided for, see FIG. 4, by providing a first level 13', a second level 15' and a third level 17'.

Each level 13', 15' and 17' includes seven (7) two-input selection gates 19, each for transferring data back to the memory ports MP0–MP6 in the same manner in which the data was transferred to the processing ports PP0–PP6, see FIG. 2. By comparing FIG. 2 with FIG. 4, one can see that under the control of a simple control word m, data can be pulled from the memory ports MP0–MP6, sent to the desired processing ports PP0–PP6 and returned back to the memory ports MP0–MP6 from whence it came. Each level 13, 15, and 17 of FIG. 2 corresponds to each level 13', 15' and 17' respectively of FIG. 4 in that the reversed data flow is channeled back to the memory ports MP0–MP6 in the same manner in which it is flowed to the processing ports PP0–PP6.

The alignment network 11 above described for a system having seven (7) memory ports may be extended to the general case wherein the number of memory ports equals N. In the general case, the alignment network 11 includes a plurality of levels, each level including N number of two-input selection gates 19. The number of levels is equal to $\log_2 (N)$ rounded up to the nearest integer. In the above example, N equalled 7 and $\log_2 (N)$ rounded up to the nearest integer equalled 3. The total number of gates 19 required in the general case is then N multiplied by $\log_2 N$ rounded up to the nearest integer.

Each level of the alignment network 11 either allows data to flow directly through or provides a data shift depending upon the control word m and more particularly upon the voltage levels applied to the ES and EO of each selection gate 19. The amount of shift in each level is equal to $k^{2(L-1)}$ modulo N, where k is relatively prime to N and is a primitive root of N, N is the number of memory modules, and L is the alignment network 11 level ranking. For example, referring to FIG. 2, wherein $k=3$, the shift occuring in the first level 13 is $3^{2(1-1)}$ modulo $7=3$. In the second level 15, the shift is $3^{2(2-1)}$ modulo $7=2$. The third level 17 shift is $3^{2(3-1)}$ modulo $7=4$.

In operation, the distance d (which is the distance between elements sought to be accessed) is known and the value m must be generated. For example, in FIG. 1, to access the elements $a_{11}$, $a_{12}$, $a_{13}$, $a_{14}$ and $a_{15}$ the distance d is unity and no shifting is required through the alignment network. Hence, it is clear in this case that m must equal zero. However, to access the data elements $a_{11}$, $a_{21}$, $a_{31}$, $a_{41}$ and $a_{51}$, the distance d is equal to five (5) and the control word m must be calculated to generate the proper shift through the alignment network 11.

Figure 5:
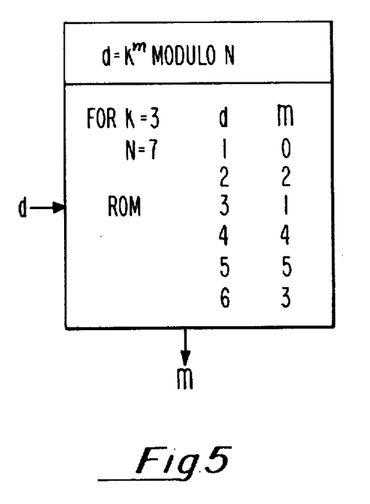
FIG. 5 is an illustration of a read-only memory (ROM) programmed to provide a control word for the alignment networks of FIG. 2 and FIG. 4.

The calculation of m is derived from the relationship $d=k^m$ modulo N, see FIG. 5, which illustrates the generation of m for the system of FIG. 2. In the preferred embodiment the value d is used to address a ROM which has been programmed to the equation $d=k^m$ modulo N to produce the value m at address d. FIG. 5 illustrates the generation of m for values of d in a system having $k=3$ and $N=7$. Alternatively, of course, m could be generated by software given the values of d, k, and N. However, hardware generation of m is preferred since in parallel processors, speed is nearly always of the essence.

Figures 6, 6C:
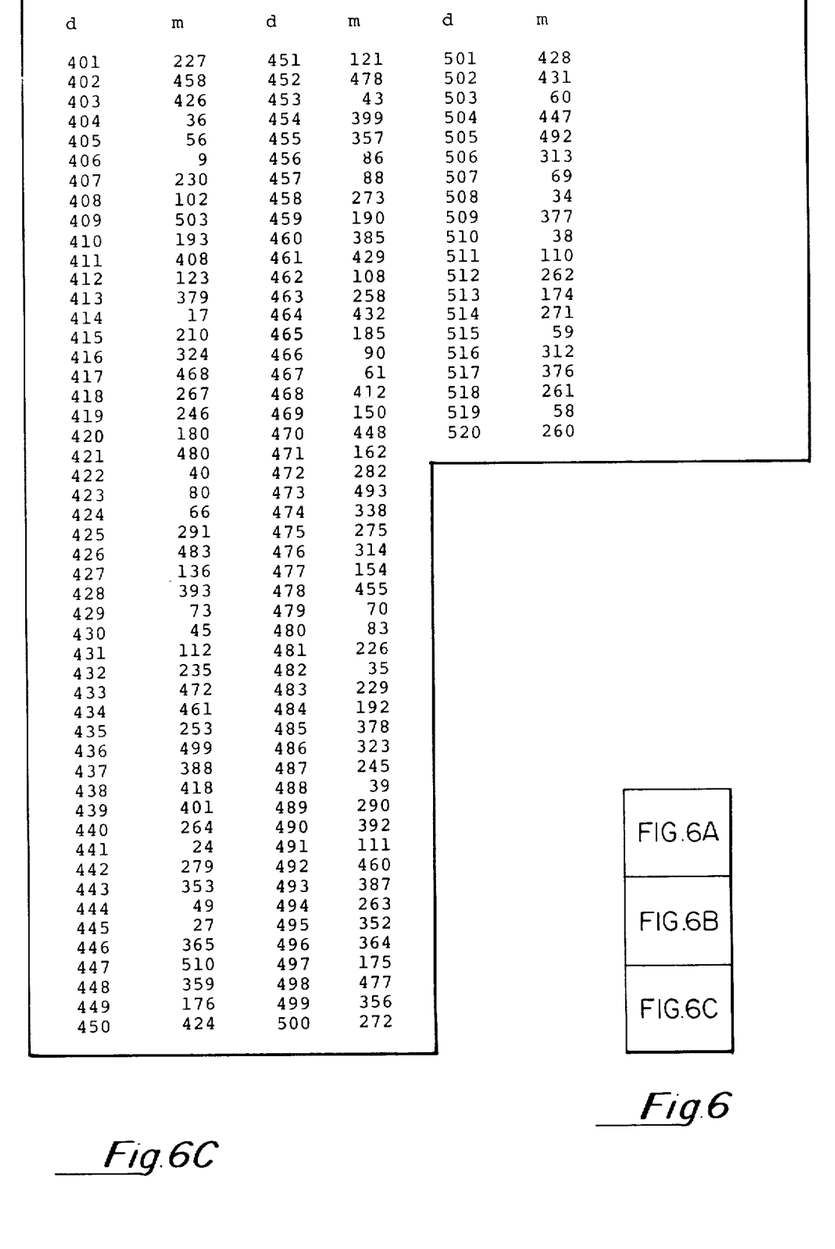
Figure 6A:
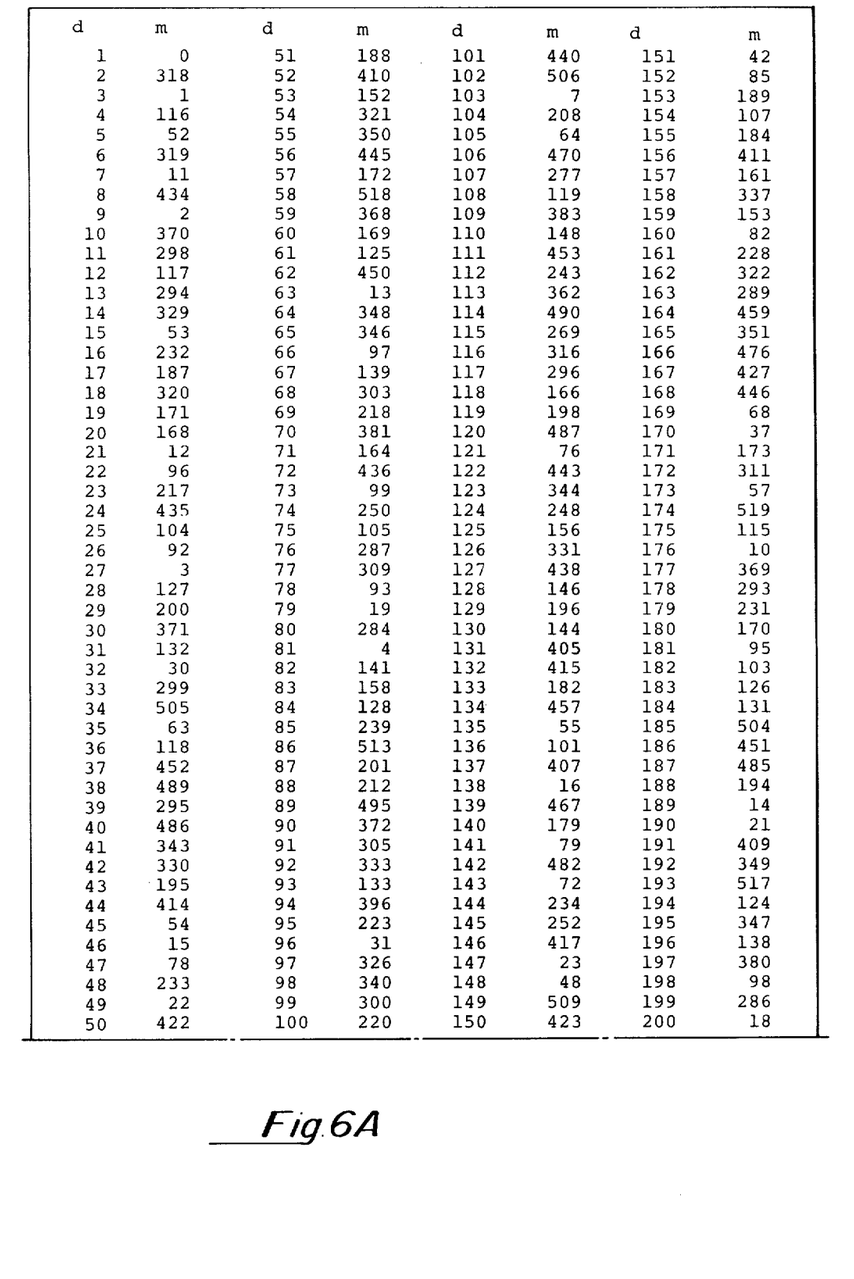

The alignment network 11 shown in FIG. 2 was developed for a system of seven (7) memory modules and a k of 3. Other arrangements may, of course, be developed. For example, in a system having seventeen (17) memory modules, a k of 3, 5, 6, 7, 10, 11, 12 or 14 may be used. FIGS. 6A–6C as positioned as shown in FIG. 6 illustrates in tabular format the generation of m for a system having $k=3$ and the number (N) of memory modules equal to 521.

Other arrangements of the present invention may be fabricated. As an illustrative example, referring to FIG. 2, levels may be combined in parallel rather than serial. If two levels were combined, for example level 13, and level 15, each selection gate 19 would require four inputs instead of two to provide for the shift required in level 13, the shift of level 15, the combined shift of levels 13 and 15 and direct through data flow. Hence, the design trade-off is the complexity of gates 19 versus an increased number of gates 19 and an increased number of levels.

Parallelism may be carried even further by combining all levels 13, 15 and 17 and by using eight-input selection gates 19.

Further, in certain applications it may be desirable to insert data storing, shifting or processing apparatus between the alignment network of the present invention and the parallel memory modules storing the data to be aligned. For example, one such apparatus would be an Electronic Barrel Switch for Data Shifting of the type disclosed by R. A. Stokes et al in U. S. Pat. No. 3,610,903. The disclosed Barrel Switch comprises a matrix of gates arranged in rectangular configuration and adapted to shift in a single clock time a multibit parallel input a preselected number of places to the left or right, either end-off or end-around. The Barrel Switch insertion permits d-ordered vectors stored in memory at various starting or base locations to be shifted to a left-most memory starting location for processing through the alignment network.

Other obvious modifications are apparent. For example, with reference to FIGS. 2 and 4, it can be appreciated that the furthest left-most selection gate 19 in all levels 13, 15 and 17 provides only direct through data flow regardless of control word m. Hence, in many applications, the left-most selection gate 19 may be deleted.

Figure 7:
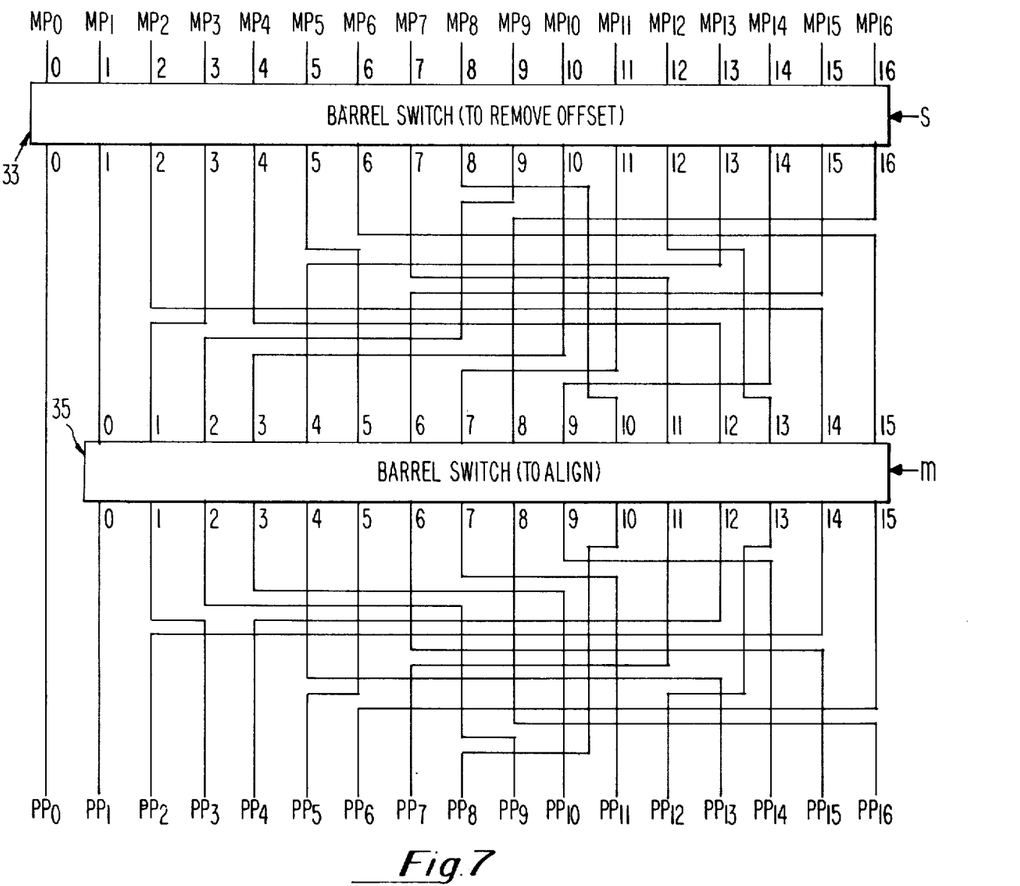
FIG. 7 is a diagram of the present alignment invention implemented by a pair of barrel switches.

With reference now to FIG. 7, the present invention may be implemented through the use of a first barrel switch 33 and a second barrel switch 35. As may be appreciated by a comparison to FIG. 2, and a review of the discussion relating thereto, the implementation of FIG. 7 performs an alignment between a plurality of memory ports MP0 through MP16 and a plurality of processor ports PP0 through PP16. It is appreciated that alignment may be implemented for any number of memory and processor ports, such as for the seven (7) shown in FIG. 2 and FIG. 5 or for the five-hundred and twenty-one (521) detailed in FIGS. 6A–6C.

The function of the first barrel switch 33 is merely to shift when required the stored d-vectors to the left-most starting position for processing through the barrel switch 35. The ordered output data paths 1 through 16 of the first barrel switch 33 are connected to the ordered input data paths 0 through 15 of the second barrel switch 35 in the sequence suggested in FIG. 8 for the equation $x=k^y$ modulo N wherein x represents the ordering of the output data paths of the first barrel switch 33 and y represents the ordering of the input data paths of the second barrel switch 35. N is the number of memory ports and k is a primitive root of N. For the embodiment shown, N equals 17 and k equals 3. The zero (0) ordered output data path of the first barrel switch 33 is connected directly to the zero (0) ordered processor port.

The ordered output data paths 0 through 15 of the second barrel switch 35 are connected to the processor ports PP1 through PP16 in a sequence opposite to the sequence interconnecting the first barrel switch 33 and the second barrel switch 35.

The control operations for the above-described FIG. 7 implementation are relatively simple. First, an S control input is provided to the first barrel switch 33 to shift the starting data element of a stored d-vector to the left-most (0) output data path of the first barrel switch 33. Second, an m control input is provided to the second barrel switch 35 to produce the desired shift increment therein. The desired shift increment is equal to the distance d (which is the distance between the data elements sought to be accessed).

Figure 8:
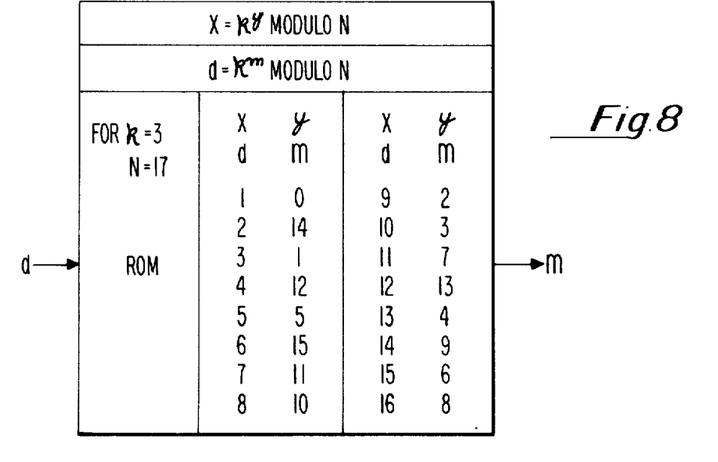
FIG. 8 is an illustration of a read-only memory (ROM) programmed to provide the control input for the second barrel switch of FIG. 7.

The calculation of m is derived from the relationship $d=k^m$ modulo N. See FIG. 8 which illustrates the calculation of m for the system of FIG. 7. In the preferred embodiment the value d is used to address a ROM which has been programmed to the equation $d=k^m$ modulo N to produce the value m at address d. FIG. 8 illustrates the generation of m for values d in a system having $k=3$ and $N=17$. Alternatively, of course, m could be generated by software given the values of d, k and N. However, hardware generation of m is preferred since in parallel processors, speed is nearly always of the essence.

Other arrangements of the present invention may be fabricated. For example, in applications wherein d vectors are stored having starting data elements all available at memory port MP0, the first barrel switch 33 is not required and may be deleted. Also, the alignment network is not, of course, limited to being interposed between memory and processor ports but may be interposed between any set of parallel ports between which alignment is desired.

Thus, while particular embodiments of the present invention have been described and illustrated, it will be apparent to those skilled in the art that changes and modifications may be made therein without departing from the spirit and scope of the invention.

What is claimed is:

1. A parallel data access alignment network for aligning data between N ordered input ports and N ordered output ports wherein N is an integer greater than one, said data comprising d-ordered vector data elements spaced d modulo N input ports apart, said network comprising:

a first barrel switch having N ordered input data paths and N ordered output data paths, said N ordered input data paths thereof being connected in direct sequential order to the N ordered input ports, said first barrel switch providing a data path connection for a data element in said d-ordered vector data elements to the lowest ordered output data path of said first barrel switch in said N ordered output data paths thereof;

a second barrel switch having $N-1$ ordered input data paths and $N-1$ ordered output data paths and being responsive to a shift control signal for shifting data flow therebetween, said $N-1$ ordered input data paths thereof being connected to the $N-1$ highest ordered data output paths of said N ordered output data paths of said first barrel switch according to the relationship $x = k^y$ modulo $N$ wherein x represents the output data path ordering of said first barrel switch, y represents the input data path ordering of said second barrel switch and k represents a primitive root of N, and said $N-1$ ordered output data paths of said second barrel switch being connected to the $N-1$ highest ordered output ports of said N ordered output ports in the same ordering sequence by which said $N-1$ ordered input data paths of said second barrel switch are connected to said $N-1$ highest ordered output data paths of said first barrel switch;

data path means for connecting the lowest ordered data path output of said N ordered data path outputs of said first barrel switch to the lowest ordered output port of said N ordered output ports; and shift control means for generating said shift control signal and providing same to said second barrel switch, said shift control signal generated from the relationship $d = k^m$ modulo N wherein d is said d-ordered vector data element input port spacing, k is said primitive root of N, N is said integer greater than one, and m is said shift control signal specifying the amount of shift in said second barrel switch between said $N-1$ ordered data output paths thereof and said $N-1$ ordered data input paths thereof.

2. The parallel data access alignment network according to claim 1 wherein said shift control means includes:

a memory addressed by said d and outputting said m in accord with said relationship $d = k^m$ modulo N.

3. The parallel data access alignment network according to claim 2 within said memory is a read-only memory.

* * * * *